United States Patent
Huang et al.

(10) Patent No.: US 11,635,060 B2
(45) Date of Patent: Apr. 25, 2023

(54) SYSTEM FOR OPERATING A WIND TURBINE USING CUMULATIVE LOAD HISTOGRAMS BASED ON ACTUAL OPERATION THEREOF

(71) Applicant: General Electric Company, Schenectady, NY (US)

(72) Inventors: Dayu Huang, Rexford, NY (US); Frederick Wilson Wheeler, Niskayuna, NY (US); George Theodore Dalakos, Niskayuna, NY (US); Ameet Shridhar Deshpande, Schenectady, NY (US); Su Liu, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 150 days.

(21) Appl. No.: 17/152,869

(22) Filed: Jan. 20, 2021

(65) Prior Publication Data
US 2022/0228560 A1    Jul. 21, 2022

(51) Int. Cl.
    *F03D 9/00*    (2016.01)
    *H02P 9/04*    (2006.01)
    (Continued)

(52) U.S. Cl.
    CPC ........... *F03D 7/045* (2013.01); *F03D 7/0264* (2013.01); *F03D 7/046* (2013.01); *F03D 15/00* (2016.05);
    (Continued)

(58) Field of Classification Search
    CPC ........ F03D 7/0264; F03D 7/045; F03D 7/046; F03D 15/00; F03D 17/00; F05B 2270/331; F05B 2270/332
    See application file for complete search history.

(56) References Cited

U.S. PATENT DOCUMENTS

| 2,837,984 A | 6/1958 | Klotz |
| 6,922,640 B2 | 7/2005 | Vezzu et al. |
| (Continued) | | |

FOREIGN PATENT DOCUMENTS

| CN | 101218401 A | 7/2008 |
| CN | 106097146 A | 11/2016 |
| (Continued) | | |

OTHER PUBLICATIONS

Tyler Acorn, "The Histogram is not so grand: An intro to Histograms and CDF's", published on Jul. 17, 2020, obtained from "lazymodellingcrew.com/post/post_10_intro-to-histogram_ta/" on Aug. 11, 2022 (Year: 2020).*

(Continued)

*Primary Examiner* — Tulsidas C Patel
*Assistant Examiner* — Thomas K Quigley
(74) *Attorney, Agent, or Firm* — Dority & Manning, P.A.

(57) ABSTRACT

A method for operating a wind turbine includes determining one or more loading and travel metrics or functions thereof for one or more components of the wind turbine during operation of the wind turbine. The method also includes generating, at least in part, at least one distribution of cumulative loading data for the one or more components using the one or more loading and travel metrics during operation of the wind turbine. Further, the method includes applying a life model of the one or more components to the at least one distribution of cumulative loading data to determine an actual damage accumulation for the one or more components of the wind turbine to date. Moreover, the method includes implementing a corrective action for the wind turbine based on the damage accumulation.

20 Claims, 10 Drawing Sheets

(51) Int. Cl.
*F03D 7/04* (2006.01)
*F03D 15/00* (2016.01)
*F03D 17/00* (2016.01)
*F03D 80/70* (2016.01)
*F03D 7/02* (2006.01)

(52) U.S. Cl.
CPC .............. *F03D 17/00* (2016.05); *F03D 80/70* (2016.05); *F05B 2240/50* (2013.01); *F05B 2260/4031* (2013.01); *F05B 2270/331* (2013.01); *F05B 2270/332* (2013.01)

(56) References Cited

U.S. PATENT DOCUMENTS

| | | | |
|---|---|---|---|
| 6,975,925 B1 | 12/2005 | Barnes et al. | |
| 7,149,657 B2 | 12/2006 | Goebel et al. | |
| 7,256,508 B2 | 8/2007 | Altemark et al. | |
| 7,395,188 B1 | 7/2008 | Goebel et al. | |
| 7,548,830 B2 | 6/2009 | Goebel et al. | |
| 7,693,670 B2* | 4/2010 | Durling | G07F 15/003 |
| | | | 706/915 |
| 7,725,293 B2 | 5/2010 | Bonissone et al. | |
| 7,889,840 B2 | 2/2011 | Vasudevan et al. | |
| 7,895,016 B2 | 2/2011 | Vittal et al. | |
| 8,108,080 B2 | 1/2012 | Wakata et al. | |
| 8,249,852 B2 | 8/2012 | Thulke | |
| 8,451,134 B2 | 5/2013 | Bharadwaj et al. | |
| 8,510,060 B2* | 8/2013 | Hardwicke | G05B 23/0283 |
| | | | 702/34 |
| 8,554,386 B2 | 10/2013 | Rutman | |
| 8,649,911 B2 | 2/2014 | Avagliano et al. | |
| 8,694,268 B2 | 4/2014 | Karikomi et al. | |
| 8,928,164 B2 | 1/2015 | Bowyer et al. | |
| 8,930,299 B2 | 1/2015 | Pyle et al. | |
| 9,018,782 B2 | 4/2015 | Couchman et al. | |
| 9,035,479 B1 | 5/2015 | Gates | |
| 9,074,468 B1 | 7/2015 | Selman et al. | |
| 9,097,236 B2 | 8/2015 | Zhou et al. | |
| 9,194,376 B2 | 11/2015 | Ritter et al. | |
| 9,279,715 B2* | 3/2016 | Hedin | G01M 13/045 |
| 9,395,270 B2 | 7/2016 | Czemiak et al. | |
| 9,599,096 B2* | 3/2017 | Spruce | H02P 9/008 |
| 9,605,654 B2* | 3/2017 | Wickstrbm | F03D 7/0292 |
| 9,644,609 B2 | 5/2017 | Turner et al. | |
| 9,772,219 B2* | 9/2017 | Hedin | G05B 19/416 |
| 9,797,328 B2 | 10/2017 | Martinez et al. | |
| 9,816,483 B2 | 11/2017 | Nakamura et al. | |
| 9,859,787 B2 | 1/2018 | Wagoner et al. | |
| 9,874,107 B2 | 1/2018 | Falb et al. | |
| 9,897,516 B2 | 2/2018 | Bechhoefer et al. | |
| 10,181,101 B2 | 1/2019 | Zhang et al. | |
| 10,260,935 B2* | 4/2019 | Hedin | G05B 19/4069 |
| 10,288,038 B2 | 5/2019 | Badrinath Krishna et al. | |
| 10,288,043 B2 | 5/2019 | Yu et al. | |
| 10,318,903 B2* | 6/2019 | Johnson | G06Q 10/087 |
| 10,318,904 B2* | 6/2019 | Johnson | G06Q 50/14 |
| 10,436,178 B2 | 10/2019 | Hales et al. | |
| 10,452,041 B2* | 10/2019 | Menon | F02C 9/28 |
| 11,015,972 B2* | 5/2021 | Hedin | G05B 19/4069 |
| 2004/0260512 A1 | 12/2004 | Olsson | |
| 2005/0005186 A1 | 1/2005 | Goebel et al. | |
| 2006/0228214 A1 | 10/2006 | Mabe et al. | |
| 2008/0140361 A1 | 6/2008 | Bonissone et al. | |
| 2011/0020122 A1 | 1/2011 | Parthasarathy et al. | |
| 2011/0296810 A1* | 12/2011 | Hardwicke | G05B 23/0283 |
| | | | 73/112.01 |
| 2012/0065901 A1 | 3/2012 | Bechhoefer et al. | |
| 2012/0286509 A1 | 11/2012 | Rafoth | |
| 2012/0296582 A1* | 11/2012 | Hedin | G01H 1/003 |
| | | | 702/56 |
| 2013/0035798 A1 | 2/2013 | Zhou et al. | |
| 2013/0073223 A1 | 3/2013 | Lapira et al. | |
| 2013/0257051 A1* | 10/2013 | Spruce | H02P 9/008 |
| | | | 290/44 |
| 2013/0270827 A1 | 10/2013 | Couchman et al. | |
| 2013/0320674 A1 | 12/2013 | Ingram | |
| 2014/0030089 A1 | 1/2014 | Wickstrom | |
| 2014/0039834 A1* | 2/2014 | Shibuya | G06F 11/22 |
| | | | 702/183 |
| 2014/0248123 A1 | 9/2014 | Turner et al. | |
| 2014/0288855 A1 | 9/2014 | Deshpande | |
| 2014/0324495 A1 | 10/2014 | Zhou et al. | |
| 2015/0003983 A1 | 1/2015 | Coultate | |
| 2015/0176569 A1 | 6/2015 | Karikomi et al. | |
| 2015/0226603 A1* | 8/2015 | Hedin | G01M 13/028 |
| | | | 702/39 |
| 2015/0381443 A1 | 12/2015 | Du Plessis | |
| 2016/0231716 A1* | 8/2016 | Johnson | G05B 13/041 |
| 2017/0096983 A1 | 4/2017 | Hales et al. | |
| 2017/0241405 A1 | 8/2017 | Kruger et al. | |
| 2018/0066630 A1 | 3/2018 | Kristoffersen | |
| 2018/0094968 A1* | 4/2018 | Hedin | G05B 19/416 |
| 2018/0142674 A1 | 5/2018 | Hammerum et al. | |
| 2018/0156197 A1 | 6/2018 | Spruce | |
| 2018/0171979 A1 | 6/2018 | Spruce | |
| 2018/0173214 A1 | 6/2018 | Higgins et al. | |
| 2018/0173215 A1 | 6/2018 | Spruce et al. | |
| 2018/0180024 A1 | 6/2018 | Spruce | |
| 2018/0180025 A1 | 6/2018 | Spruce et al. | |
| 2018/0180026 A1 | 6/2018 | Spruce et al. | |
| 2018/0187648 A1 | 7/2018 | Spruce et al. | |
| 2018/0187649 A1 | 7/2018 | Spruce et al. | |
| 2018/0187650 A1 | 7/2018 | Byreddy et al. | |
| 2018/0223808 A1 | 8/2018 | Spruce | |
| 2019/0203696 A1 | 7/2019 | Kaucic et al. | |
| 2019/0368919 A1* | 12/2019 | Hedin | G01M 13/045 |
| 2020/0347824 A1 | 11/2020 | Yu et al. | |
| 2021/0123416 A1* | 4/2021 | Vestergaard | F03D 7/0292 |

FOREIGN PATENT DOCUMENTS

| | | |
|---|---|---|
| CN | 110059872 A | 7/2019 |
| EP | 2053241 A1 | 4/2009 |
| EP | 2578874 A1 | 4/2013 |
| EP | 2457320 B1 | 4/2014 |
| EP | 2837984 B1 | 5/2019 |
| EP | 2956831 B1 | 8/2019 |
| WO | WO2017000955 A1 | 1/2017 |
| WO | WO2017000958 A1 | 1/2017 |
| WO | WO2017000959 A1 | 1/2017 |
| WO | WO2017000963 A1 | 1/2017 |
| WO | WO2017000964 A1 | 1/2017 |
| WO | WO2017205221 A1 | 11/2017 |
| WO | WO2019/148775 A1 | 8/2019 |
| WO | WO 2019/214785 A1 | 11/2019 |
| WO | WO2020/200421 A1 | 10/2020 |

OTHER PUBLICATIONS

Barradas Berglind, Fatigue-Damage Estimation and Control for Wind Turbines, Department of Electronic Systems, Automation & Control, Ph.D. Thesis Aalborg University, 2015, 70 Pages. https://doi.org/10.5278/vbn.phd.engsci.00040.

Spruce, Simulation and Control of Windfarms, University of Oxford, Department of Engineering Science, Ph.D. Thesis, 1993, 241 Pages. https://ora.ox.ac.uk/objects/uuid:24f51a31-e2f9-422f-9837-3c28cfe12ccc.

European Search Report for EP application No. 22151015,9, dated Jun. 15, 2022.

* cited by examiner

SYSTEM FOR OPERATING A WIND TURBINE USING CUMULATIVE LOAD HISTOGRAMS BASED ON ACTUAL OPERATION THEREOF

FIELD

The present disclosure relates generally to wind turbines and, more particularly, to systems and methods for operating a wind turbine using cumulative load histograms based on actual operation thereof.

BACKGROUND

Wind power is considered one of the cleanest, most environmentally friendly energy sources presently available and wind turbines have gained increased attention in this regard. A modern wind turbine typically includes a tower, a generator, a gearbox, a nacelle, and one or more rotor blades. The rotor blades are the primary elements for converting wind energy into electrical energy. The blades typically have the cross-sectional profile of an airfoil such that, during operation, air flows over the blade producing a pressure difference between its sides. Consequently, a lift force, which is directed from the pressure side towards the suction side, acts on the blade. The lift force generates torque on the main rotor shaft, which is connected to a generator for producing electricity.

Typically, wind turbines are designed to operate at a fixed nominal power output over a predetermined or anticipated operating life. For instance, a typical wind turbine is designed for a 20-year life. However, in many instances, this anticipated overall operating life is limited or based on the anticipated fatigue life of one or more of the wind turbine components. The life consumption or operational usage of the wind turbine (which can include fatigue or extreme loads, wear, and/or other life parameters) as used herein generally refers to the life of the wind turbine or its components that has been consumed or exhausted by previous operation. Thus, for conventional wind turbines, various preventative maintenance actions are generally scheduled at predetermined time intervals over the life of the wind turbine to prevent accelerated life consumption that may occur if such maintenance actions were not performed.

However, the cost and associated downtime of such maintenance actions are significant drivers for the overall lifecycle cost of the wind turbine and should therefore be optimized. In addition, wind turbines with higher operational usage may be under-maintained and more at risk for unplanned poor-quality events. Similarly, wind turbines with lower operational usage may over-maintained.

As an example, wind turbine components (such as the rotor blades, tower, pitch bearings, gearbox, etc.) have physics-based life models that are used during design and siting phases to ensure that the component(s) can survive the anticipated lifetime operation. Such a model uses input parameters specific to the component and specific lifetime load histograms determined through simulation of a lifetime of operation. As such, the model is designed to capture the complex and non-linear mechanism by which these loads act upon and damage the physical materials of the component. The model can then output a measure of damage or reliability (failure probability) predicted over the turbine lifetime.

The model output can then be compared to a threshold to determine whether the damage output is acceptable to operate the wind turbine as planned. Generally, the threshold accounts for material strength, acceptable risk, and possible reduction factors to account for uncertainty in aspects of simulation and modeling. If the model output is less than the threshold, turbine operation is deemed safe and acceptable. With such models, the threshold for acceptable operation on the model output can be converted to a damage threshold on damage, which the model also produces.

Moreover, wind turbines are simulated to determine suitability for a specific application. The complex simulation covers aero-elastic mechanical behavior of the entire wind turbine, under control, and in wind conditions anticipated for the turbine design lifetime. These simulations directly produce the loads data needed to create the loads histograms used by the component life models.

Thus, an improved system and method for operating wind turbines, e.g., actual operational data, would be welcomed in the art. Accordingly, the present disclosure is directed to systems and methods for operating a wind turbine using cumulative load histograms based on actual operation thereof rather than simulated data.

BRIEF DESCRIPTION

Aspects and advantages of the invention will be set forth in part in the following description, or may be obvious from the description, or may be learned through practice of the invention.

In one aspect, the present disclosure is directed to a method for operating a wind turbine. The method includes determining one or more loading and travel metrics or functions thereof for one or more components of the wind turbine during operation of the wind turbine. The method also includes generating, at least in part, at least one distribution of cumulative loading data for the one or more components using the one or more loading and travel metrics during operation of the wind turbine. Further, the method includes applying a life model, such as a physics-based model, a statistics model, or combinations thereof, of the one or more components to the at least one distribution of cumulative loading data to determine an actual damage accumulation for the one or more components of the wind turbine to date. Moreover, the method includes implementing a corrective action for the wind turbine based on the damage accumulation.

In an embodiment, the loading metrics for one or more components of the wind turbine may include, for example, a bearing load, a tower load, a rotor blade load, a drivetrain load, a shaft load, a thermal load. In another embodiment, the travel metrics may include, for example, time, angular travel, a number of times a component starts up and shuts down, a number of times a component travels a certain angular distance between directional reversals, or a number of times the one or more components go through a stress cycle at a particular load.

In further embodiments, the component(s) may include, for example, a pitch bearing, a yaw bearing, a tower, a gearbox, a generator, a rotor blade, a rotor, a hub, a shaft, a converter, a fan, or a nacelle, or any sub-component of these major components.

In additional embodiments, the functions of the one or more loading and travel metrics may include a mean, a minimum, a maximum, a standard deviation, a median, a quantile, or similar.

In several embodiments, determining the one or more loading and travel metrics for one or more components of the wind turbine during operation of the wind turbine may include measuring the one or more loading and travel metrics for one or more components of the wind turbine via one or more sensors or processors or estimating the one or more loading and travel metrics for one or more components of the wind turbine via the one or more processors.

In another embodiment, the method may include estimating the one or more loading and travel metrics for one or more components of the wind turbine in real-time. In particular embodiments, the method may further include estimating the one or more loading and travel metrics for one or more components of the wind turbine using machine learning.

In an embodiment, the processor may include a physics-based system model for estimating the one or more loading and travel metrics for one or more components of the wind turbine.

In certain embodiments, the method may include determining a plurality of loading and travel metrics for one or more components of the wind turbine during operation of the wind turbine.

In yet another embodiment, generating, at least in part, at least one distribution of cumulative loading data for the one or more components using the one or more loading and travel metrics during operation of the wind turbine may include generating, at least in part, at least one cumulative load histogram for the one or more components using the one or more loading and travel metrics. As opposed to storing time-series data, for example, the use of histograms is beneficial because the storage requirements do not significantly increase with time. As used herein, a distribution generally refers to any data structure, such as a histogram, data binning, or hashing, that can accumulate and represent the frequency and/or counts of numerical data.

In further embodiments, generating the at least one cumulative load histogram for the one or more components using the one or more loading and travel metrics may include defining a range and bin regions of the at least one cumulative load histogram, defining a first loading metric of the plurality of loading metrics and a first travel metric of the plurality of travel metrics for the at least one cumulative load histogram, and during operation of the wind turbine, populating the at least one cumulative load histogram using the first loading and travel metrics by adding the first loading and travel metrics to the bin regions of the cumulative load histogram(s).

In an embodiment, the method may also include adaptively changing at least one of the range or the bin regions based on on-going operational data of the wind turbine.

In additional embodiments, the method may include applying a life or damage model of the component(s) to a plurality of cumulative load histograms collected over distinct time segments.

In still further embodiments, the method may include processing the cumulative load histogram(s) before applying the life or damage model of the component(s).

In several embodiments, processing the cumulative load histogram(s) before applying the life model of the component(s) may include at least one of re-defining the range or bin regions of the cumulative load histogram(s), smoothing or recalibrating the cumulative load histogram(s) to yield a more accurate estimate of historical loading estimates, or scaling the cumulative load histogram(s) to a desired time duration expected by the life model.

In particular embodiments, implementing the corrective action for the wind turbine based on the damage accumulation may include shutting down the wind turbine, idling the wind turbine, changing a power output, torque, speed, or other control parameter of the wind turbine, and/or scheduling one or more preventative maintenance actions.

In another aspect, the present disclosure is directed to a system for operating a wind turbine. The system includes a controller configured to implement a plurality of operations, including but not limited to determining one or more loading and travel metrics or functions thereof for one or more components of the wind turbine during operation of the wind turbine, generating, at least in part, at least one cumulative load histogram for the one or more components using the one or more loading and travel metrics, applying a life or damage model of the one or more components to the at least one distribution of cumulative loading data to determine an actual damage accumulation for the one or more components of the wind turbine to date, and implementing a corrective action for the wind turbine based on the damage accumulation.

It should be understood that the system may further be configured to with any of the features described herein.

These and other features, aspects and advantages of the present invention will become better understood with reference to the following description and appended claims. The accompanying drawings, which are incorporated in and constitute a part of this specification, illustrate embodiments of the invention and, together with the description, explain the principles of the invention.

BRIEF DESCRIPTION OF THE DRAWINGS

A full and enabling disclosure of the present invention, including the best mode thereof, directed to one of ordinary skill in the art, is set forth in the specification, which refers to the appended figures, in which.

DETAILED DESCRIPTION

Figure 1:
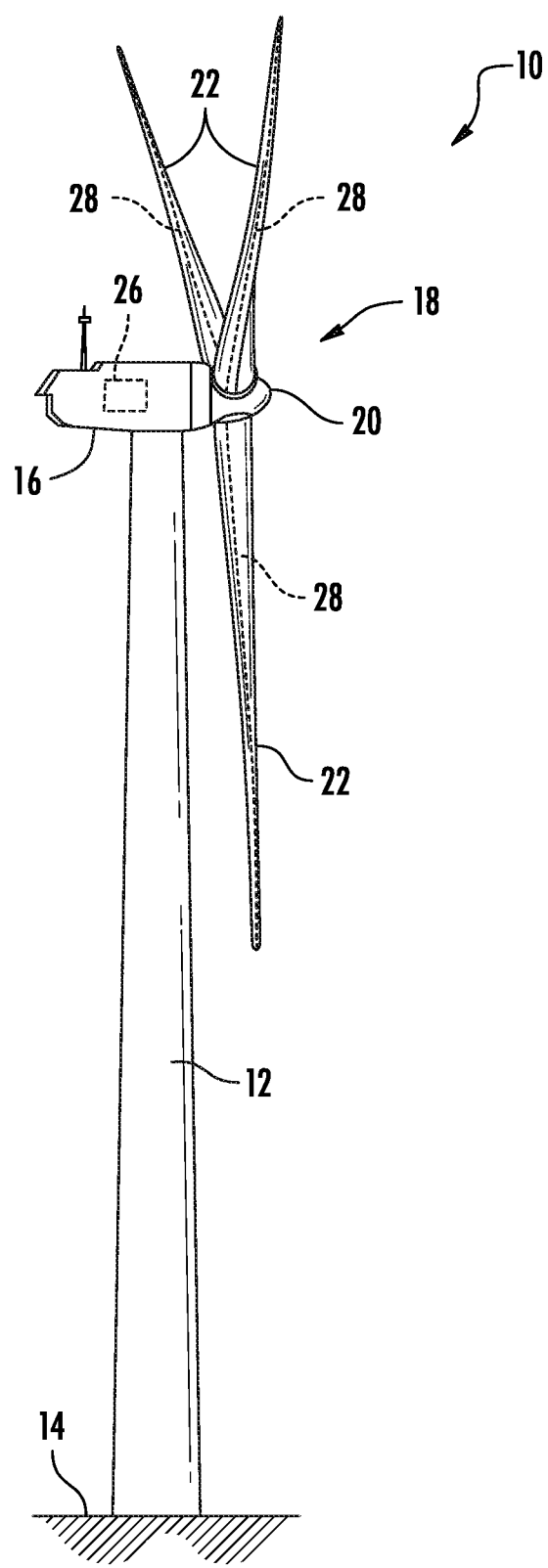
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present disclosure is directed odometer-based supervisory control of a wind turbine. For example, in an embodiment, as the wind turbine operates, cumulative damage done to turbine components with respect to their failure modes can be estimated and tracked, e.g., using fatigue/damage odometers. Supervisory control adjusts the operation of the wind turbine to achieve a long-term operational goal. The operational goal may be to maximize energy or revenue production while keeping extreme loads and cumulative damage metrics within limits. Alternatively, the operational goal may be to minimize one or more cumulative damage metrics while keeping extreme loads and other cumulative damage metrics within limits. Such fatigue/damage odometers may be developed, for example, using histograms that are populated with actual operational data of the wind turbine.

The present disclosure provides many advantages not present in the prior art. For example, the use of histograms is beneficial because the storage requirements do not significantly increase with time. Moreover, the present disclosure may be implemented within the turbine controller hardware, on a different computer within or at the wind turbine site, or on a network-connected computer elsewhere at the wind farm or other nearby or remote location. Furthermore, the present disclosure can utilize readily-available/already-existing operational data and is not necessarily required to collect new or additional data (although new or additional sensors may be utilized if desired). Further, the present disclosure can be applied to any wind turbine, regardless of model, design, size, or manufacturer. Furthermore, the system and method of the present disclosure enables mechanical design and load margins to be fully utilized for each wind turbine, based upon how each turbine is actually operated and the conditions a particular turbine actually experiences.

Referring now to the drawings, FIG. 1 illustrates a perspective view of one embodiment of a wind turbine 10 configured to implement the control technology according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (FIG. 2) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine. Further, the controller 26 may be communicatively coupled to any number of the components of the wind turbine 10 in order to control the operation of such components and/or to implement a corrective action. As such, the controller 26 may include a computer or other suitable processing unit. Thus, in several embodiments, the controller 26 may include suitable computer-readable instructions that, when implemented, configure the controller 26 to perform various functions, such as receiving, transmitting and/or executing wind turbine control signals.

Accordingly, the controller 26 may generally be configured to control the various operating modes of the wind turbine 10 (e.g., start-up or shut-down sequences), adjust control parameters of the wind turbine 10 to alter power production, and/or control various components of the wind turbine 10. For example, the controller 26 may be configured to control the blade pitch or pitch angle of each of the rotor blades 22 (i.e., an angle that determines a perspective of the rotor blades 22 with respect to the direction of the wind) to control the power output generated by the wind turbine 10 by adjusting an angular position of at least one rotor blade 22 relative to the wind. For instance, the controller 26 may control the pitch angle of the rotor blades 22 by rotating the rotor blades 22 about a pitch axis 28, either individually or simultaneously, by transmitting suitable control signals to a pitch drive or pitch adjustment mechanism (not shown) of the wind turbine 10.

Figure 2:
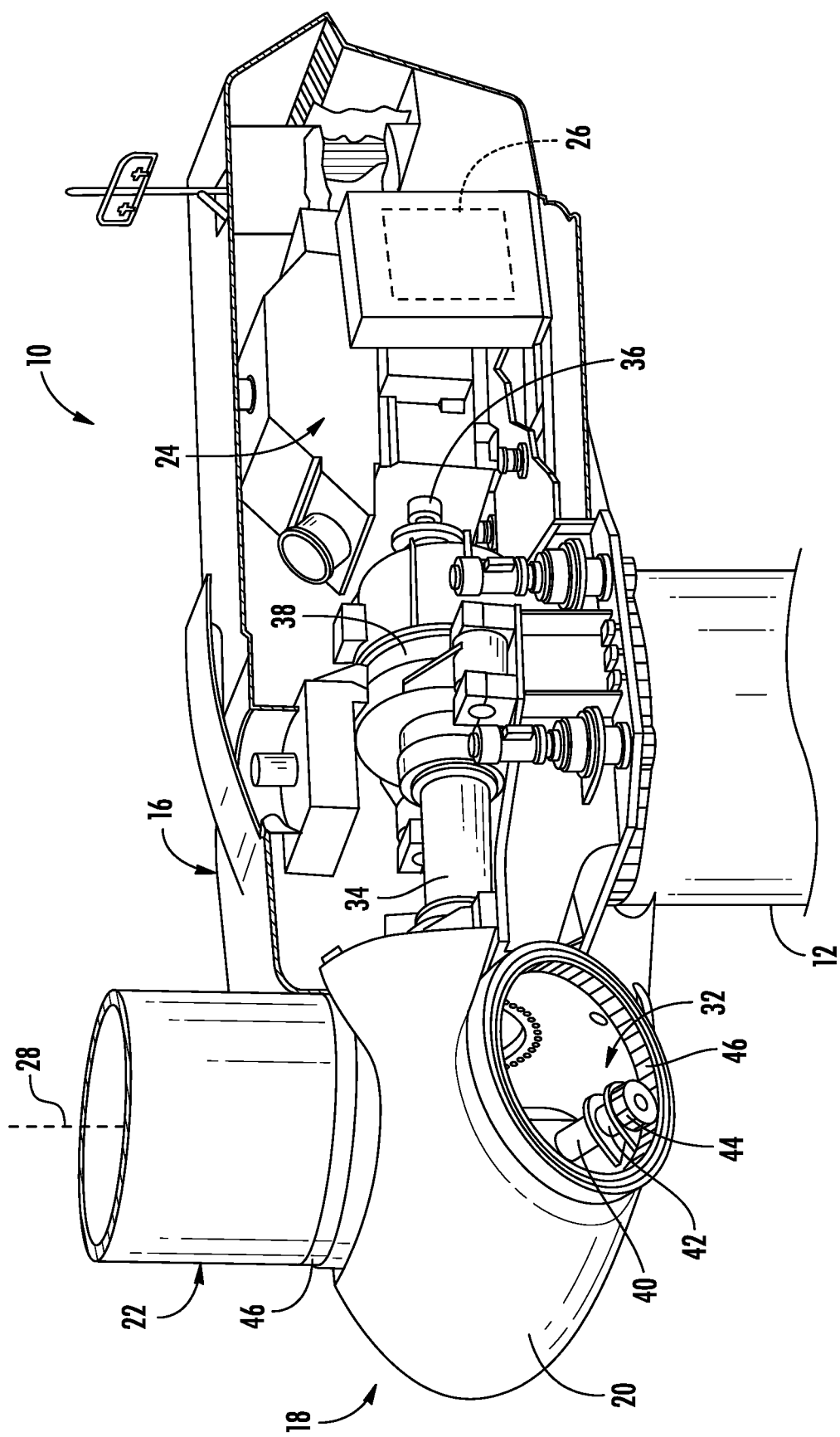
FIG. 2 illustrates a simplified, internal view of one embodiment of a nacelle of a wind turbine according to the present disclosure.

Referring now to FIG. 2, a simplified, internal view of one embodiment of the nacelle 16 of the wind turbine 10 shown in FIG. 1 is illustrated. As shown, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

Each rotor blade 22 may also include a pitch adjustment mechanism 32 configured to rotate each rotor blade 22 about its pitch axis 28. Further, each pitch adjustment mechanism 32 may include a pitch drive motor 40 (e.g., any suitable electric, hydraulic, or pneumatic motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 22 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 22 about the pitch axis 28. Similarly, the wind turbine 10 may include one or more yaw drive mechanisms 66 communicatively coupled to the controller 26, with each yaw drive mechanism(s) 66 being configured to change the angle of the nacelle 16 relative to the wind (e.g., by engaging a yaw bearing 68 of the wind turbine 10).

Figure 3:
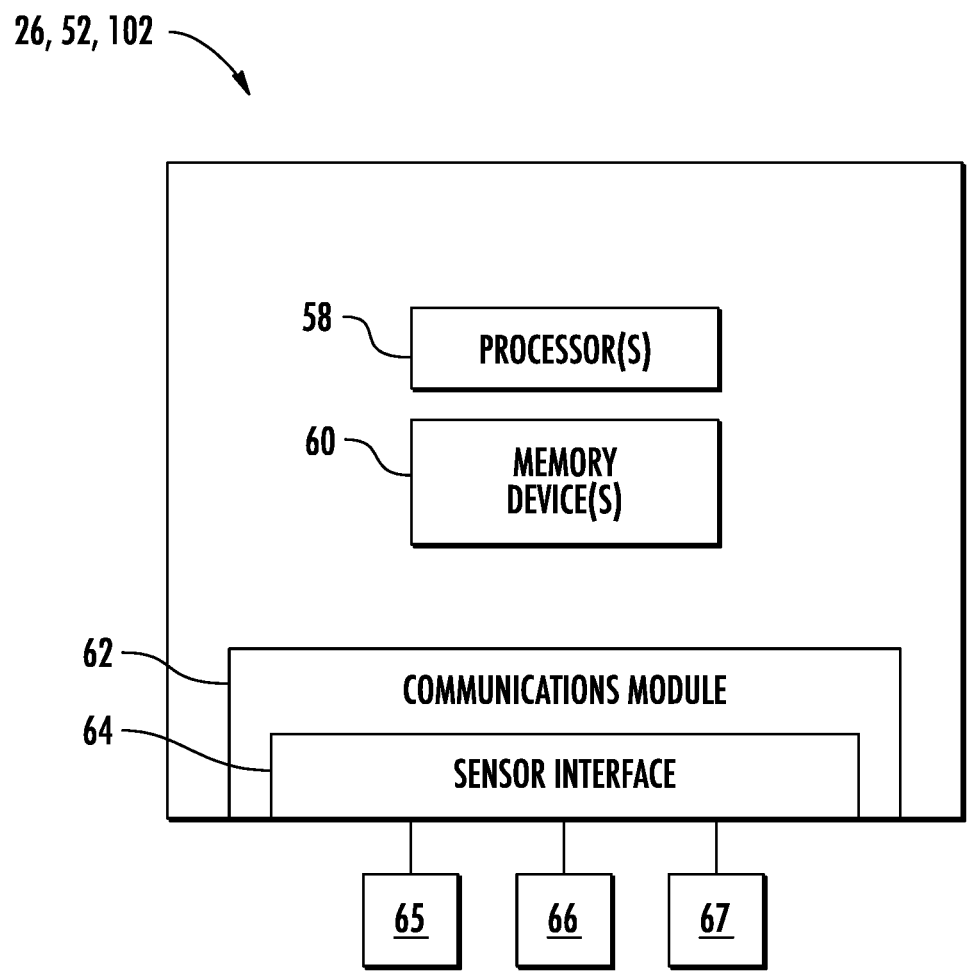
FIG. 3 illustrates a schematic view of one embodiment of suitable components that may be included within a turbine controller of the wind turbine shown in FIG. 1.

Referring now to FIG. 3, a block diagram of one embodiment of suitable components that may be included within a controller in accordance with aspects of the present disclosure is illustrated. It should be understood that the various components of the controller of FIG. 3 may be applicable to any suitable controller, including for example, the turbine controller 26, the farm-level controller 56, and/or the supervisory controller 102 described herein.

As shown, the controller may include one or more processor(s) 58 and associated memory device(s) 60 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 60 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements.

Additionally, the controller may also include a communications module 62 to facilitate communications between the controller and the various components of the wind turbine 10. For instance, the communications module 62 may include a sensor interface 64 (e.g., one or more analog-to-digital converters) to permit the signals transmitted by one or more sensors 65, 66, 67 to be converted into signals that can be understood and processed by the controller. It should be appreciated that the sensors 65, 66, 67 may be communicatively coupled to the communications module 62 using any suitable means. For example, as shown in FIG. 3, the sensors 65, 66, 67 are coupled to the sensor interface 64 via a wired connection. However, in other embodiments, the sensors 65, 66, 67 may be coupled to the sensor interface 64 via a wireless connection, such as by using any suitable wireless communications protocol known in the art. As such, the processor 58 may be configured to receive one or more signals from the sensors 65, 66, 67.

The sensors 65, 66, 67 of the wind turbine 10 may be any suitable sensors configured to measure any operational condition and/or wind parameter at or near the wind turbine. For example, the sensors 65, 66, 67 may include blade sensors for measuring a pitch angle of one of the rotor blades 22 or for measuring a loading acting on one of the rotor blades 22; generator sensors for monitoring the generator (e.g., torque, rotational speed, acceleration and/or the power output); and/or various wind sensors for measuring various wind parameters. In addition, the sensors 65, 66, 67 may be located near the ground of the wind turbine, on the nacelle, or on a meteorological mast near the wind turbine.

It should also be understood that any other number or type of sensors may be employed and at any location. For example, the sensors may be analog sensors, digital sensors, optical/visual sensors, accelerometers, pressure sensors, angle of attack sensors, vibration sensors, MIMU sensors, fiber optic systems, temperature sensors, wind sensors, Sonic Detection and Ranging (SODAR) sensors, infra lasers, Light Detecting and Ranging (LIDAR) sensors, radiometers, pitot tubes, rawinsondes, and/or any other suitable sensors. It should be appreciated that, as used herein, the term "monitor" and variations thereof indicate that the various sensors of the wind turbine may be configured to provide a direct measurement of the parameters being monitored or an indirect measurement of such parameters. Thus, the sensors 65, 66, 67 may, for example, be used to generate signals relating to the parameter being monitored, which can then be utilized by the controller to determine the actual condition.

As mentioned, the processor(s) 58 is configured to perform any of the steps of the methods according to the present disclosure. For example, the processor 58 may be configured to determine the operational usage for the wind turbine 10. As used herein, "operational usage" generally refers to the number of operating seconds, minutes, hours, or similar that the wind turbine 10 and or its various components has operated at various operational parameters and/or under certain conditions. Such operational parameters that may be considered or tracked may include, for example, one or more of the following: power output, torque, pitch angle, a loading condition, generator speed, rotor speed, wind direction, air density, turbulence intensity, wind gusts, wind shear, wind speed, wind upflow, an amount of yawing, an amount of pitching, or temperature. Moreover, the operational data may include sensor data, historical wind turbine operational data, historical wind farm operational data, historical maintenance data, historical quality issues, or combinations thereof. Thus, the processor 58 may also be configured to record and store the operational usage in the memory store 60 for later use. For example, the processor 58 may store the operational usage in one or more look-up tables (LUTs). Moreover, the operational usage may be stored in the cloud.

Figure 4:
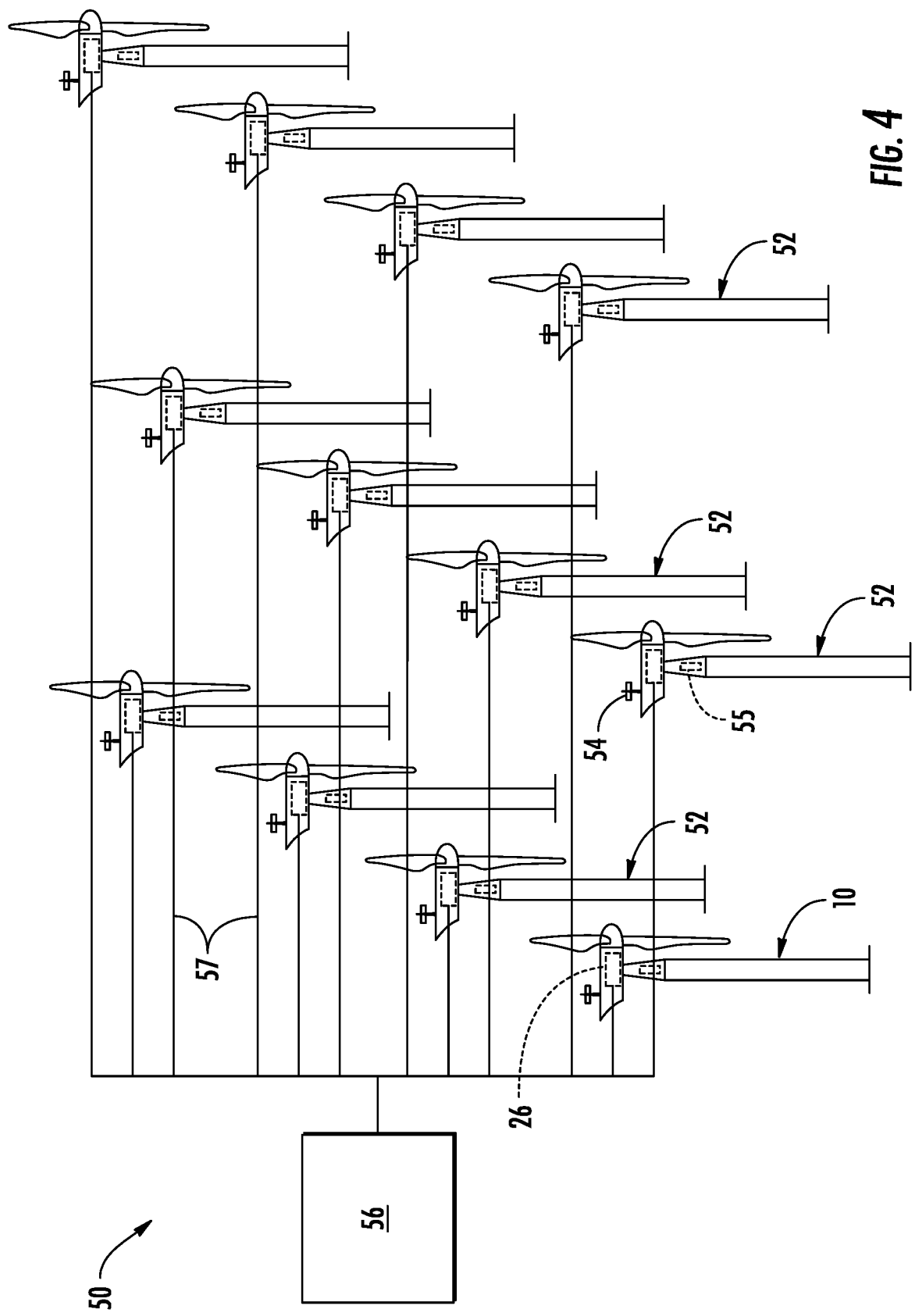
FIG. 4 illustrates a wind farm having a plurality of wind turbines according to the present disclosure.

Referring now to FIG. 4, the system and method as described herein may also be combined with a wind farm controller 56 of a wind farm 50. As shown, the wind farm 50 may include a plurality of wind turbines 52, including the wind turbine 10 described above. For example, as shown in the illustrated embodiment, the wind farm 50 includes twelve wind turbines, including wind turbine 10. However, in other embodiments, the wind farm 50 may include any other number of wind turbines, such as less than twelve wind turbines or greater than twelve wind turbines. In one embodiment, the controller 26 of wind turbine 10 may be communicatively coupled to the farm controller 56 through a wired connection, such as by connecting the controller 26 through suitable communicative links 57 (e.g., a suitable cable). Alternatively, the controller 26 may be communicatively coupled to the farm controller 56 through a wireless connection, such as by using any suitable wireless communications protocol known in the art.

In several embodiments, one or more of the wind turbines 52 in the wind farm 50 may include a plurality of sensors for monitoring various operating parameters/conditions of the wind turbines 52. For example, as shown, one of the wind turbines 52 includes a wind sensor 54, such as an anemometer or any other suitable device, configured for measuring wind speeds. As is generally understood, wind speeds may vary significantly across a wind farm 50. Thus, the wind sensor(s) 54 may allow for the local wind speed at each wind turbine 52 to be monitored. In addition, the wind turbine 52 may also include an additional sensor 55. For instance, the sensors 55 may be configured to monitor electrical properties of the output of the generator of each wind turbine 52, such as current sensors, voltage sensors, temperature sensors, or power monitors that monitor power output directly based on current and voltage measurements. Alternatively, the sensors 55 may comprise any other sensors that may be utilized to monitor the power output of a wind turbine 52. It should also be understood that the wind turbines 52 in the wind farm 50 may include any other suitable sensor known in the art for measuring and/or monitoring wind conditions and/or wind turbine conditions.

Figure 5:
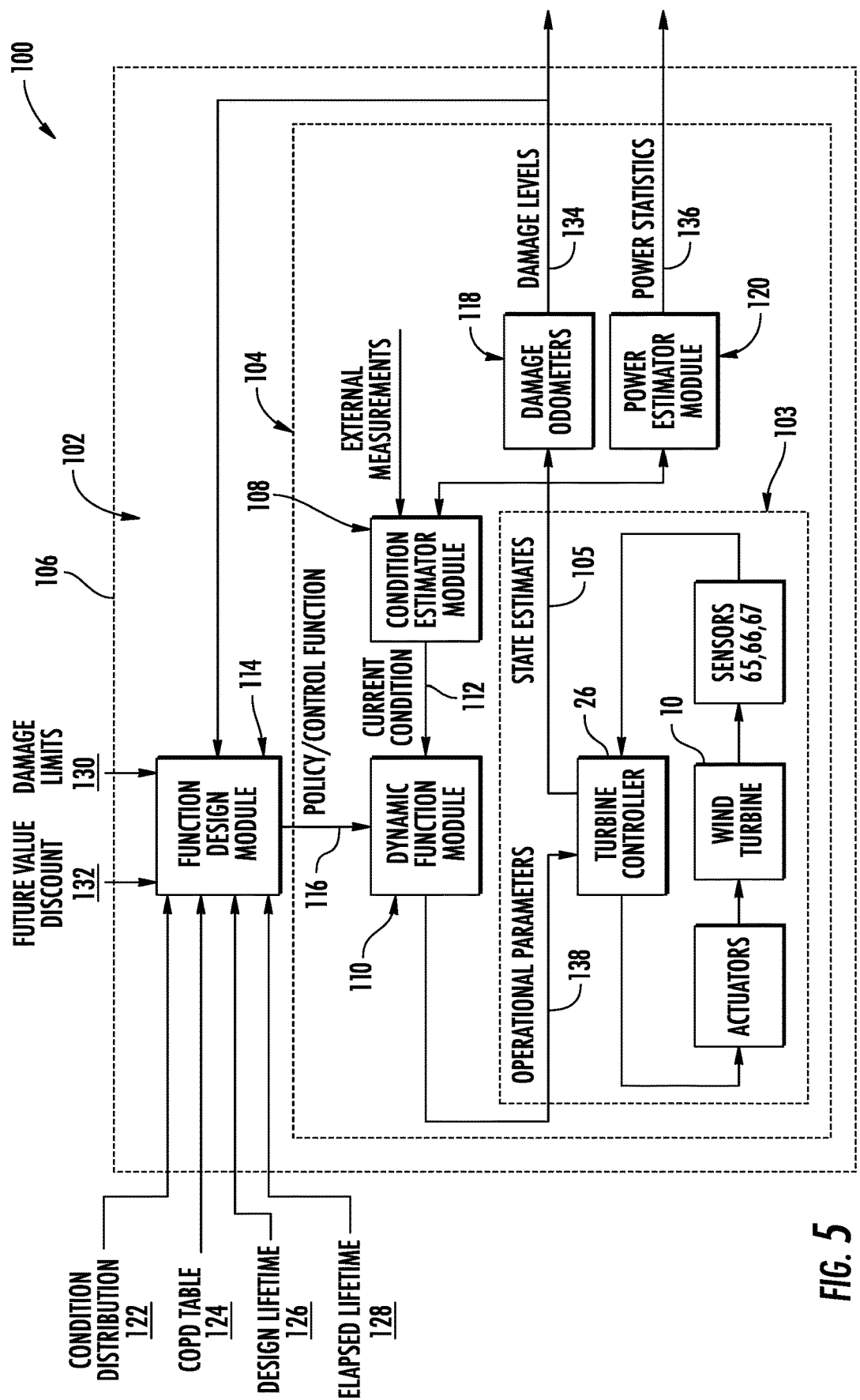
FIG. 5 illustrates a block diagram of one embodiment of an odometer-based control system for controlling a wind turbine connected to an electrical grid according to the present disclosure.

Referring now to FIGS. 5-11, various features of multiple embodiments of an odometer-based control (OBC) system 100 and method 200 for operating a wind turbine, such as wind turbine 10, are presented in accordance with aspects of the present disclosure. More specifically, FIG. 5 illustrates a block diagram of one embodiment of system 100 for controlling the wind turbine 10 according to the present disclosure. For example, as shown, the OBC system 100 includes the turbine controller 26 and a supervisory controller 102 communicatively coupled to the turbine controller 26. In particular, as shown, the turbine controller 26 may be part of an inner control loop 103 that includes the wind turbine control system. In such embodiments, the wind turbine 10 may include one or more sensors read by the turbine controller 26, such as electrical components and accelerometers. Thus, the turbine controller 26 is configured to send control signals to actuators, such as blade pitch and nacelle yaw motors. The actuators affect turbine dynamic behavior. Therefore, the turbine controller 26 is configured to operate the wind turbine 10 to generate power while preventing undesired or damaging behavior. Moreover, the turbine controller 26 can have many operational parameters that may be set to alter or tune the turbine performance. The operational parameters are usually unchanged or changed in an ad hoc fashion during turbine operation, however, as will be described herein, the OBC system 100 can modify some of these parameters using an optimized policy or control function 116, as described herein below. Such operational parameters may include, for example, torque setpoint, speed setpoint, thrust limit, and/or parameters controlling when active pitching for rotor imbalance control is enabled. Moreover, the turbine controller 26 is configured to determine a state estimate 105 of the wind turbine 10, which is explained in more detail herein below.

Still referring to FIG. 5, the supervisory controller 102 may include a middle control loop 104 and an outer control loop 106. The middle control loop 104, or supervisory parameter control loop, is configured to improve turbine control and performance by changing turbine controller operational parameters based on estimates of the conditions, such as the wind or grid conditions. In particular, as shown, the middle control loop 104 may include a condition estimator module 108, a dynamic function module 110, one or more damage odometers 118, and a power estimator module 120.

Thus, in certain embodiments, the condition estimator module 108 is configured to estimate or predict the values of the condition parameters described herein based upon the state estimate 105, and possibly also external measurements. These condition parameters are generally referred to collectively herein as a current condition 112. In other words, the current condition 112 generally refers to the current estimate or prediction of the condition parameters in the condition parameter set, which are described herein in more detail below.

In addition, as shown, the damage odometer(s) 118 are configured to estimate damage levels of the various wind turbine components as a function of the state estimate 105 of the wind turbine 10. In general, each of the damage levels corresponds to a specific component and specific failure mode for that component. As such, the value of the damage level represents cumulative damage. Examples include blade root fatigue, tower base fatigue, and pitch bearing fatigue, though any number of damage levels may be generated and considered. In wind turbine design and siting, damage (generally fatigue) limits are often established to ensure safe and reliable operation. Thus, these limits can be based on damage models for the specific construction materials, manufacturing quality, and stress cycle counting and Goodman or similar damage curves.

Furthermore, the damage odometer(s) described herein may utilize the history of the state estimates from the turbine controller 26, and models of the wind turbine 10 and its components to determine damage done to the turbine based on its actual operation over its elapsed lifetime. Accordingly, the damage level for each component in the damage level set can be determined. In certain embodiments, there may be different damage odometers for different parts of the wind turbine 10, and there can be multiple damage odometers for a single part or component of the wind turbine 10, each associated with a different failure mode or wear mechanism. For example, many damage odometers are associated with crack propagation and fatigue failure modes of structural materials. In certain embodiments, damage odometers may be implemented based on the state estimate 105 from the turbine controller 26, where the state estimate includes instantaneous loads and forces on the wind turbine 10. In alternative embodiments, the damage odometers may also be based upon special sensors such as strain gauges (not shown). Moreover, in addition to damage levels, the damage odometers may produce an uncertainty level for each damage parameter that can be used by the function design module 114.

In further embodiments, damage assessment may utilize a fusion of damage odometers with a validated diagnostic algorithm, based on real-time operating signals or condition monitoring system. For example, if the pitch motor internal signals or generator acceleration signals suggest an abnormal operation, damage assessment would be high even if odometer reads low. Thus, the OBC system 100 may use both to assess real-time damage when addressing same failure mode.

In addition, in an embodiment, the power estimator module 120 is configured to computer statistics of the power production of the wind turbine 10. In certain embodiments, this computation will simply be the cumulative energy produced but may also include other cumulative statistics or statistics computed for each dynamic control interval. Accordingly, the power statistics 136 may be used to externally evaluate turbine performance, or to learn the power production performance of the wind turbine 10.

Still referring to FIG. 5, the current condition 112 from the condition estimator module 108 can then be used by the dynamic function module 110 to set operational parameters for the next time dynamic control interval. The condition estimator module 108 may also simply produce an estimate of the current condition parameters (not a prediction). If the dynamic control interval is relatively short, such as 30 seconds or one minute, this can be adequate. The condition estimator module 108 may also produce a prediction of condition parameters for the next time dynamic control interval. Predicting the future values of the condition parameters becomes more desirable when the dynamic control interval is longer.

Accordingly, the dynamic function module 110 is configured to change the operational parameters for the turbine controller 26, depending on the current condition 112. In certain embodiments, the dynamic function module 110 may include a lookup operation where the current condition is received and used to determine the operational parameters from the policy table. Thus, in certain embodiments, the dynamic function module 110 changes the operational parameters each dynamic control interval. As used herein, the dynamic control interval generally refers to the time duration for which the dynamic function module 110 sets the operational parameters.

Moreover, in particular embodiments, the outer control loop 106, or odometer-based control loop, further includes a function design module 114 for generating a policy or control function 116. Further, the function design module 114 is also configured to update the control function 116, based on the current fatigue damage state, expected future conditions, a system model of the turbine, planned operation horizon, and possibly expected future value of produced electricity.

In an embodiment, for example, the control function 116 defines a relationship of the set of condition parameters with a plurality of operational parameters of the wind turbine 10. More particularly, the control function 116 may be a mapping from condition parameters in the condition parameter set to operational parameters in the operational parameter set that is essentially executed by the dynamic function module 110. Thus, in an embodiment, the control function 116 may be a look up table, an interpolated function, or have any other functional form. In one embodiment, the control function 116 may be a constant policy, whereby the operational parameters are the same for any values of the condition parameters. This is equivalent to not having a middle loop. Another simple example of the control function 116 is one that stipulates a higher rated torque (for more power) when air density is below a threshold and wind speed is less than 15 m/s. But in general, the control function 116 is an arbitrary function of the current condition 112, may be complex. Thus, in many embodiments, the control function 116 may be determined by an optimization process in the function design module 114 block.

Furthermore, in certain embodiments, the control function 116 may be defined for discrete values of the condition parameters, and the current condition 112 may be continuous. In this case, the dynamic function module 110 may select the closest entry in the control function 116 from the current condition 112 to determine the operational parameters, or the dynamic function module 110 may interpolate the operational parameters. As such, the dynamic function module 110 receives the control function 116 from the function design module 114. Moreover, the dynamic function module 110 determines and sends operational parameters to the turbine controller 26 to dynamically control the wind turbine 10 based on the current condition 112 and the control function 116 for multiple dynamic control intervals.

Still referring to FIG. 5, the function design module 114 is configured to determine the control function 116 through an optimization process, for example, using a condition distribution 122, a model 124 of operational behavior of the wind turbine 10, a design lifetime 126 of the wind turbine 10 (e.g., the total time over which the wind turbine 10 is planned to operate), an elapsed lifetime 128 of the wind turbine 10 (e.g., the amount of time during the design lifetime for which the wind turbine 10 has operated thus far), one or more damage limits 130, the one or more damage levels 134 (e.g. from the damage odometers), or a future value discount 132 (e.g. the value of money in the future for value optimization). Such information represents the current state of the wind turbine 10 and the expected future conditions the wind turbine 10 will experience and a model of its operational behavior. Given these inputs there are a variety of optimization methods that may be used to produce the control function 116.

As used herein, the condition distribution generally refers to the expected future distribution of condition parameters in the condition parameter set. In one embodiment, for example, the condition distribution is a joint probabilistic distribution of the condition parameters. Thus, in an embodiment, if the condition parameter set consists of wind speed and turbulence intensity, the condition distribution may be a joint distribution of these two values. For practical reasons, the condition distribution may be instead independent distributions of each condition parameter, or some condition parameters may be assumed constant.

In certain embodiments, the condition distribution may be established for a wind turbine and wind farm before commission using, for example, met mast data. Furthermore, the condition distribution may be fixed and unchanging, or it may be adaptively learned and updated over time, as the wind turbine 10 operates.

In another embodiment, the model 124 of operational behavior of the wind turbine 10 may include a table of Condition parameters, Operational parameters, Power, and/or Damage (referred to herein as a COPD table 124), i.e., a model of power produced, and damage done to the wind turbine 10, depending on condition parameters and/or operational parameters. Therefore, in such embodiments, the model 124 may be a representation of the turbine operational behavior that models aspects of the turbine system response needed by the OBC system 100. In one embodiment, for example, the model may be a mapping from the condition parameters and the operational parameters to the expected power statistics 136 the wind turbine 10 will produce, and the expected increment to the damage values done to turbine components in a dynamic control interval. In other words, if wind and grid conditions are known and the operational parameters to be selected are known, then the model/table provides how much power the wind turbine 10 will produce and how much damage the wind turbine 10 will accumulate during one dynamic control interval. In such embodiments, the expected power statistics 136 of the wind turbine 10 may include power production, power factor, power stability of the wind turbine 10, or similar.

There are several ways in which the model of operational behavior of the wind turbine 10 may be determined. For example, in one embodiment, the model of operational behavior of the wind turbine 10 can be determined using a simulation of the wind turbine 10, a design of experiments (DOE) process carried out by the wind turbine 10, adaptive learning as the wind turbine 10 operates, and/or combinations thereof.

Furthermore, in an embodiment, the function design module 114 is configured to use the design lifetime duration when designing the control function 116 to ensure that the expected damage done in the design lifetime is within the damage limits. It should be understood that the OBC system 100 can be used with newly installed wind turbines as well as an upgrade to existing wind turbines. Therefore, the design lifetime and the damage limits may be scaled appropriately.

In additional embodiments, the future value discount generally refers to the discount applied to revenue and optionally to the negative value of expense at times in the future. This may be represented simply as a discount rate. The future value discount may also more generally be represented as a specific discount for revenue and expense at future points in time. The future value discount may optionally be used by the function design module 114 to optimize value, especially in terms of net present value.

Figure 6:
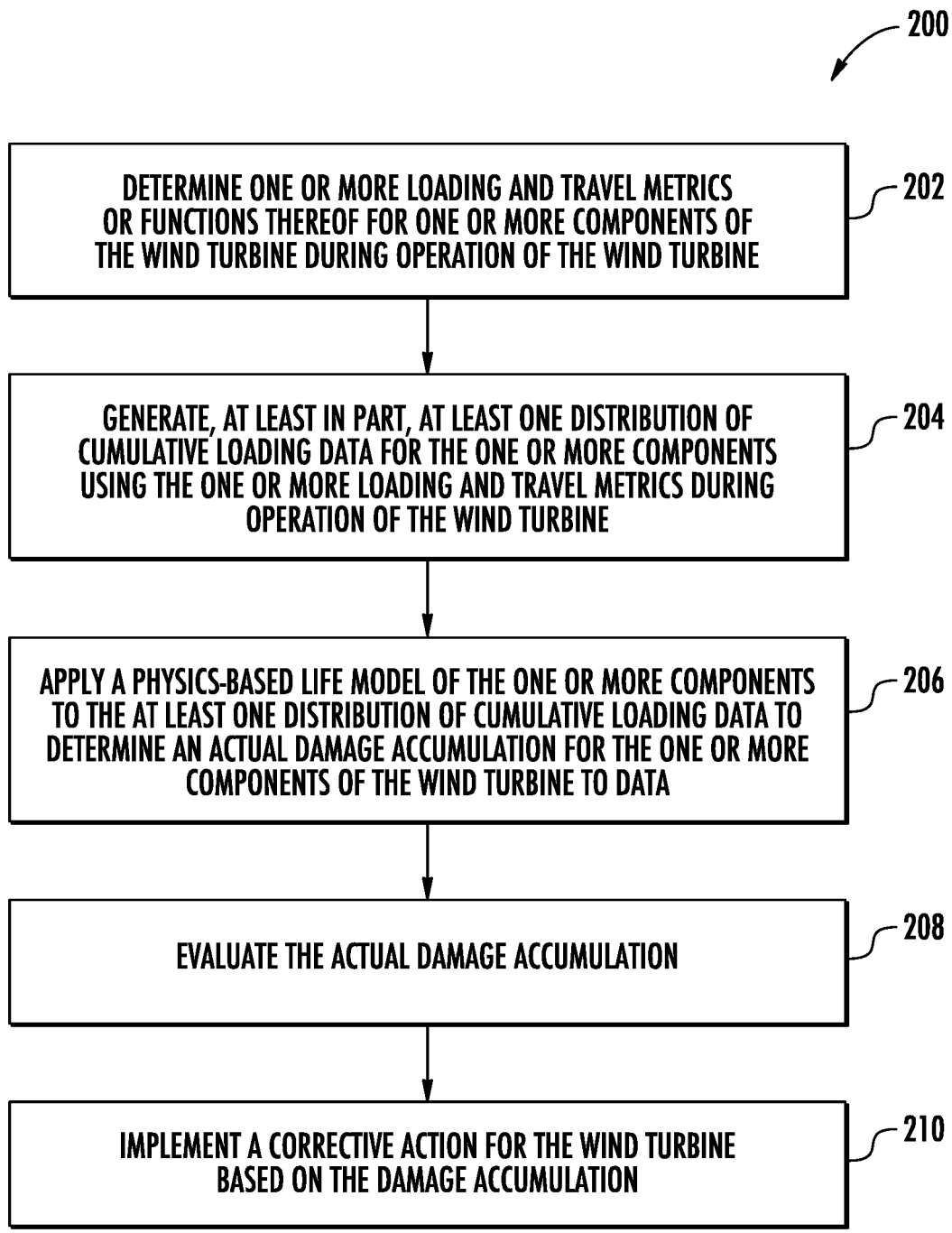
FIG. 6 illustrates a flow diagram of one embodiment of a method for operating a wind turbine according to the present disclosure.

Referring now to FIG. 6, a flow diagram of one embodiment of the method 200 for operating a wind turbine is illustrated in accordance with aspects of the present disclosure. In particular embodiments, for example, the method 200 can be used to generate one or more of the damage odometers 118 described herein. The method 200 is described herein as implemented using, for example, at least one of the wind turbines 52 of the wind farm 50 described above, such as wind turbine 10. However, it should be appreciated that the disclosed method 200 may be implemented using any other suitable wind turbine now known or later developed in the art. In addition, although FIG. 6 depicts steps performed in a particular order for purposes of illustration and discussion, the methods described herein are not limited to any order or arrangement. One skilled in the art, using the disclosures provided herein, will appreciate that various steps of the methods can be omitted, rearranged, combined and/or adapted in various ways.

As shown at (202), the method 200 includes determining and travel metrics or functions thereof for one or more components of the wind turbine 10 during operation of the wind turbine 10. For example, in one embodiment, the method 200 may include collecting loading and travel metrics measurements from one or more sensors, such as a strain gauge or similar sensor. In alternative embodiments, the method 200 may include estimating the loading and travel metrics, e.g., via a processor. In particular embodiments, the processor may include a physics-based loads estimators as part of the control system. Such estimators are configured to produce real-time estimates of the loading and travel metrics that are required by component life models. In further embodiments, the loads may also be estimated by a heuristic or machine learning trained function. Thus, the measured or estimated loading and travel metrics reflect the actual operation of the wind turbine 10 rather than the pre-commission assumed operation. Accordingly, the present disclosure can eliminate or significantly reduce the modeling error in the simulation.

If the loading metric(s) are obtained from a control-oriented estimator, a smoothing step can be performed to refine the loading metric(s). In such embodiments, a smoother retrospectively improves estimator performance using later observations. An example of smoother is Kalman smoothing, which is the backward version of Kalman filtering. Smoothing can be particularly helpful in the case of missing data or estimator reset.

Further, in such embodiments, to implement the smoother, the online fatigue odometers 118 described herein can store measurement data from the current time to the past over a specified time window. The time window, typically a few seconds, can be chosen to cover the transient dynamics of the wind turbine 10. As such, smoothing can be performed with the measurement data within the time window in a moving horizon fashion. The stored data may then be discarded after smoothing if desired. In the case of missing data or estimator reset, the time window can also be reset.

As shown at (204), the method 200 includes generating, at least in part, at least one distribution of cumulative loading data for the one or more components using the loading and travel metrics during operation of the wind turbine 10. For example, in one embodiment, the distribution of cumulative loading data for the component(s) may be at least one cumulative load histogram for the component(s). In further embodiments, the distribution of cumulative loading data may be any sort of data binning or distribution mechanism, bucketizing mechanism or hashing data structure method. Accordingly, in such embodiments, the cumulative load histograms are based upon actual operation of the wind turbine 10 and the aforementioned measured/estimated loading and travel metrics are used instead of predicted loads from simulations. In particular embodiments, the specific set of histograms required and used may depend on the component and component life model.

Furthermore, in certain embodiments, each histogram may have a travel metric and a loading metric. In such embodiments, the loading metric(s) may include, for example, a bearing load, a tower load, a rotor blade load, a drivetrain load, a shaft load, a thermal load, or similar (such as an estimated bending moment or torque of part of the turbine, such as the main shaft, blade root, or tower base). In another embodiment, the travel metric(s) may include, for example, time, angular travel, a number of times a component travels a certain angular distance between directional reversals, or a number of times the one or more components go through a stress cycle at a particular load.

In such embodiments, the bending torque may be in a single direction or may be a resultant torque for multiple directions. In further embodiments, statistics of the load time series, such as the standard deviation, mean, median, minimum, maximum, quantiles, the difference between minimum and maximum loading metric(s) during a stress cycle or certain interval, may also be used as the loading metric(s) to form the histogram. In an example, when the loading metric(s) is the difference between minimum and maximum bending moment during a stress cycle, the travel metric(s) may be the count of the number of occurrences of this magnitude of change. In yet another embodiment, the load metric(s) may be a scalar or a vector. For example, in an embodiment, the bending moment in two orthogonal directions may be used together as the loading metric(s). In this case, the histogram may be a two-dimensional histogram.

In one embodiment, for example, original one-second load measurements that exhibit variations of a load over time may no longer be available. In such embodiments, a distribution of the load measurements may be estimated from the statistics to recapture that variation. For example, a truncated Gaussian distribution that has the same mean, standard deviation, minimum and maximum of the measurement statistics may be used. Such an estimated distribution may be used to fill in the histogram, e.g., for a 10-minute time period, capturing the variation of the load measurements. Based on actual load distribution data, other types of distribution models may also be used to better capture empirical data distributions.

In another embodiment, the loading and travel metrics may be received and used to cumulatively populate the histogram. The histogram may be defined in advance with a range and bin regions for the loading metric(s). In such embodiments, as each measurement is received, the travel metric(s) is added to the appropriate bin. In another embodiment, the histogram may also be more sophisticated and may be adaptively changed in real-time, such that its range or bin regions are modified based on data accumulated to date or other requirements. In particular embodiments, the bin regions may have non-uniform bin size, for example, higher resolution where the component life model is more sensitive to variation in load. In another embodiment, the bin regions may be uniform in size. In certain embodiments, the bin width and range may be set to match the expected or required input of an established damage calculation process.

In yet another embodiment, the bin regions may have variable width and may be adapted over time to match the loading metrics data. Moreover, the cumulative load histogram may be an ordinary density-type (or frequency-type or cumulative-type) histogram, or a cumulative probability mass function over discrete values. In addition, accumulation of data into the cumulative load histogram may be done deterministically or stochastically, with some probability of accumulations being made into alternate bin regions.

In further embodiments, for each required histogram, a single histogram may be accumulated. In alternative embodiments, multiple histograms may be accumulated, with each histogram for a different external condition. For example, there may be one histogram for below-rated operation and one for above-rated operation. This may be necessary if the fatigue life model is different under different external conditions. This may also be necessary of the component life model has different accuracy under different operating conditions. This may be necessary if components or software are changed.

In additional embodiments, a preprocess step to determine whether or not histogram data should be included or excluded can be based on a variety of sources that could include, for example, status-based categorical data characterizing the operating state or status of the wind turbine 10 and other wind turbines. For example, in some cases, where it is known that the estimator has little predictive power or characterized by excessive scatter, filtering these states may become desirable. Moreover, in the case of unavailable data or when data is corrupted, signals from other wind turbines on the wind farm may be used as a proxy for that wind turbine 10. A crowd-based or collective average or known weighted function based on farm layout and waking conditions may also be used to correct the average proxy replacement signal.

Referring still to FIG. 6, as shown at (206), the method 200 includes applying a life model of the component(s) (also referred to herein as the component life model) to the distribution of cumulative loading data to determine an actual damage accumulation for the component(s) of the wind turbine 10 to date. For example, in one embodiment, the component life model may be applied to a set of histograms using the actual partial accumulated histograms instead of predicted full-life histograms. Moreover, as an example, the life model may be a physics-based model, a statistics model, or combinations thereof. This resulting damage output represents the damage that the turbine component has accumulated to date, based upon its actual operation. This damage may be used directly as part of a turbine control mechanism or to guide condition-based maintenance of the wind turbine 10. In further embodiments, the component damage model may be applied to histograms collected over distinct time segments. In this mode, a histogram is accumulated for a period of time, the component damage model is applied to the histogram and the output fatigue damage for the time period is recorded. This process can then be repeated. The damage recorded for each period of time can be added up to determine the total damage.

Corrections to the damage accumulation/output determined by the component life model may also be applied to its output. In such embodiments, these corrections may improve the damage estimate and may correct a bias. The corrections may be based on physical understanding, based on observed behavior, engineering safety factors, and/or other any suitable parameter.

Moreover, in an embodiment, the cumulative loads histogram may also be post-processed before application of the component life model. In such embodiments, processing the cumulative load histogram(s) before applying the model of the component(s) may include at least one of re-defining the range or bin regions of the cumulative load histogram(s), smoothing or recalibrating the cumulative load histogram(s) to yield a more accurate estimate of historical loading estimates, or scaling the cumulative load histogram(s) to a desired time duration expected by the life model.

As shown at (208), the method 200 includes evaluating the actual damage accumulation, e.g., to determine if the wind turbine 10 has exceeded its design life. In such embodiments, the damage accumulation or output can be divided by a damage threshold to yield a percentage of the design life utilized. Thus, in such embodiments, the damage or rate of damage accumulation may be compared between wind turbines to prioritize inspections or investigations into unusual behavior.

Referring still to FIG. 6, as shown at (210), the method 200 includes implementing a corrective action for the wind turbine 10 based on the damage accumulation. For example, in particular embodiments, the corrective action may include shutting down the wind turbine 10, idling the wind turbine 10, changing a control parameter of the wind turbine 10 (such as power output, speed, torque, etc.), scheduling one or more preventative maintenance actions, and/or any other suitable action.

In certain embodiments, the corrective action may be determined by comparing the actual damage accumulation to one or multiple damage thresholds. In another embodiment, the corrective action may be determined by mapping the actual damage accumulation into at least one of a probability of failure/survival, an economic cost, a simulation of future turbine operations, etc. In still another embodiment, the corrective action may be determined by a machine learning model that receives the actual damage accumulation as an input.

In particular, the damage or fatigue odometers described herein may be used for operation optimization of the wind turbine 10 through supervisory control. Through many control system parameters and options, the wind turbine 10 can generate more energy with more accumulated damage or less energy with less accumulated damage. In one embodiment, for example, it may be desirable to maximize energy production while accounting for damage accumulated and considering damage limits and risk created by additional damage. In such embodiments, a supervisory control system can make this trade-off and control the wind turbine 10 based in part on input from the fatigue/damage odometers 118. This control action can be further completed in conjunction with many other constraints on turbine operation, such as extreme load and electrical system limits.

In additional embodiments, the fatigue/damage odometers 118 may also be used to schedule maintenance and inspections of wind turbine components. In addition, the fatigue/damage odometers 118 may be used to determine whether the wind turbine 10 may continue to safely operate beyond its design life, or what mitigations are required to do so.

In still further embodiments, many histogram-based fatigue odometers 118 can be used on the wind turbine 10. In such embodiments, each odometer can be specific to a component and failure mode for which a life model exists. For turbine control and condition-based maintenance, separate odometers for each component may be used. Separate odometers may also be combined into a single metric covering all failure modes of a component or all components of a turbine for other purposes.

In an embodiment, the cumulative loads histogram(s) described herein may be one-dimensional, though it should be understood that the cumulative loads histogram may be two-dimensional or multi-dimensional where the component life model requires an input that is a joint distribution of multiple aspects of one or more loading metric(s). For example, a component life model for part of the structure of the wind turbine 10 may require a two-dimensional joint distribution of the load cycle magnitude and load cycle mean, with load cycles determined from a load cycle algorithm, such as rainflow counting. In this case, a two-dimensional histogram of load cycle magnitude and load cycle mean may be used.

Figure 7:
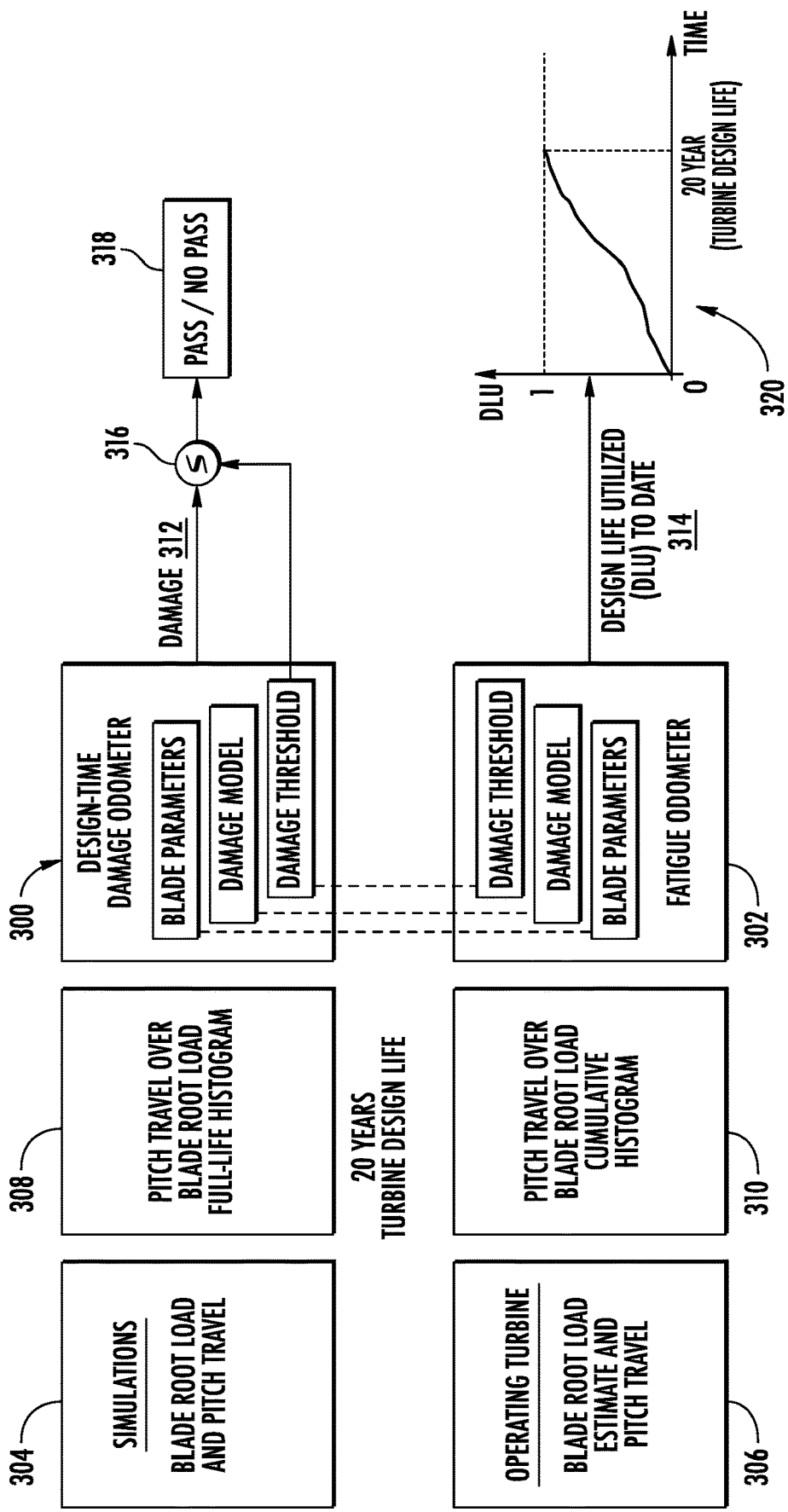
FIG. 7 illustrates a block diagram of one embodiment of a system for operating a wind turbine using a damage/life odometer according to the present disclosure.

Referring now to FIG. 7, a block diagram of one embodiment of a design-time damage odometer 300 according to conventional construction compared with an online fatigue odometer 302 according to the present disclosure are provided. As shown and previously discussed, the design-time damage odometer 300 uses simulations 304, whereas the online fatigue odometer 302 uses data 306 collected during operation of the wind turbine 10. Thus, as shown at 308 and 310, respectively, the design-time damage odometer 300 also uses a full-life histogram (e.g., assuming a 20-year life), whereas online fatigue odometer 302 uses a cumulative load histogram populated to date. Accordingly, the design-time damage odometer 300 and the fatigue odometer use their respective, but different histograms 308, 310 to determine damage 312 or design life utilized (DLU) to date 314. As shown at 316 and 318, the design-time damage odometer 300 can then compare the damage level 312 to a threshold and determines whether the damage level 312 is acceptable. In contrast, the online fatigue odometer 302 uses the DLU 314 to develop a chart 320 that can be used to evaluate whether the wind turbine 10 damage aligns with predicted levels, or whether the damage or higher or lower than such values.

Figure 8:
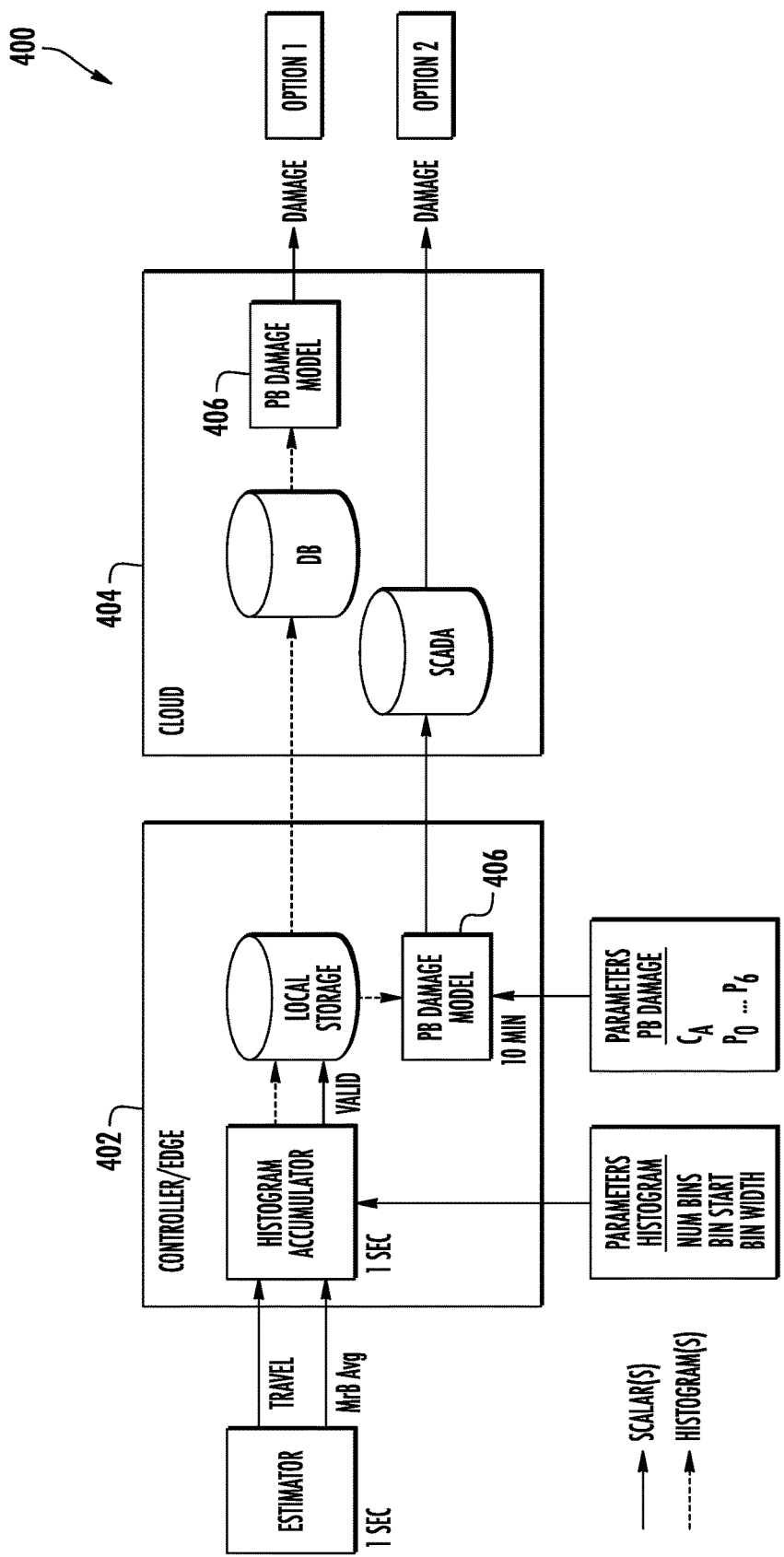
FIG. 8 illustrates a block diagram of one embodiment of a system for generating a pitch bearing online life odometer according to the present disclosure.

Referring now to FIG. 8, a schematic diagram of one embodiment of an example system 400 for generating a pitch bearing (PB) online life odometer according to the present disclosure is illustrated. More particularly, as shown, the system 400 includes two options for determining pitch bearing damage. First, as shown, the cumulative load histograms can be transmitted from the controller 402 to the cloud 404 where the pitch bearing damage model 406 can be applied. Second, as shown, the pitch bearing model 406 can be applied at the controller 402 and the damage level can be transmitted to the cloud 404. In alternative embodiments, the pitch bearing model 406 can also be applied at the controller 402 and used at the controller 402 (not shown).

Figure 9:
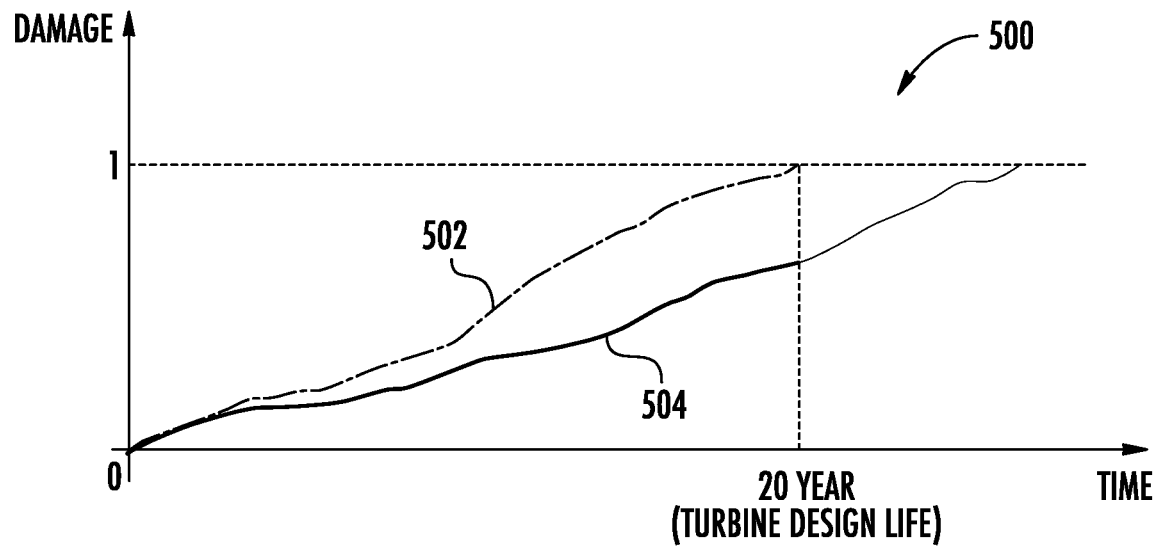
FIG. 9 illustrates a graph of one embodiment of fatigue accumulation over time with and without odometer-based control activated according to the present disclosure.
Figure 10:
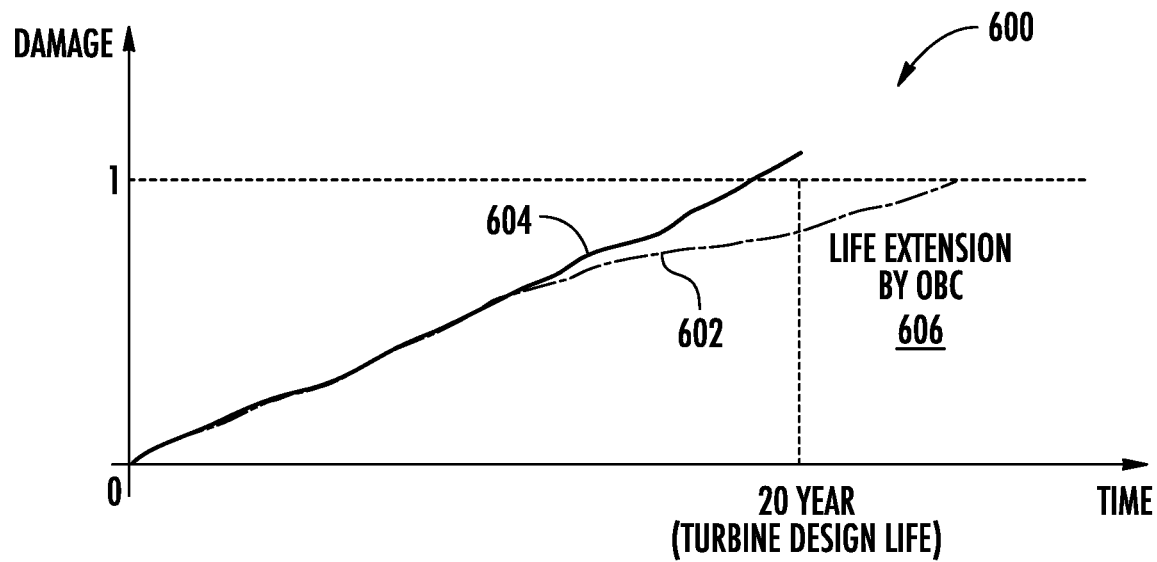
FIG. 10 illustrates a graph of one embodiment of fatigue accumulation over time with and without odometer-based control activated according to the present disclosure, particularly illustrating the life extension provided by the odometer-based control.

Referring now to FIGS. 9 and 10, various graphs of embodiments of fatigue accumulation over time are illustrated. In particular, FIG. 9 illustrates a graph 500 of fatigue accumulation over time with 502 and without 504 odometer-based control (OBC) activated according to the present disclosure. FIG. 10 illustrates a graph 600 of one embodiment of fatigue accumulation over time with 602 and without 604 odometer-based control activated according to the present disclosure, particularly illustrating the life extension 606 provided by the odometer-based control.

Figure 11:
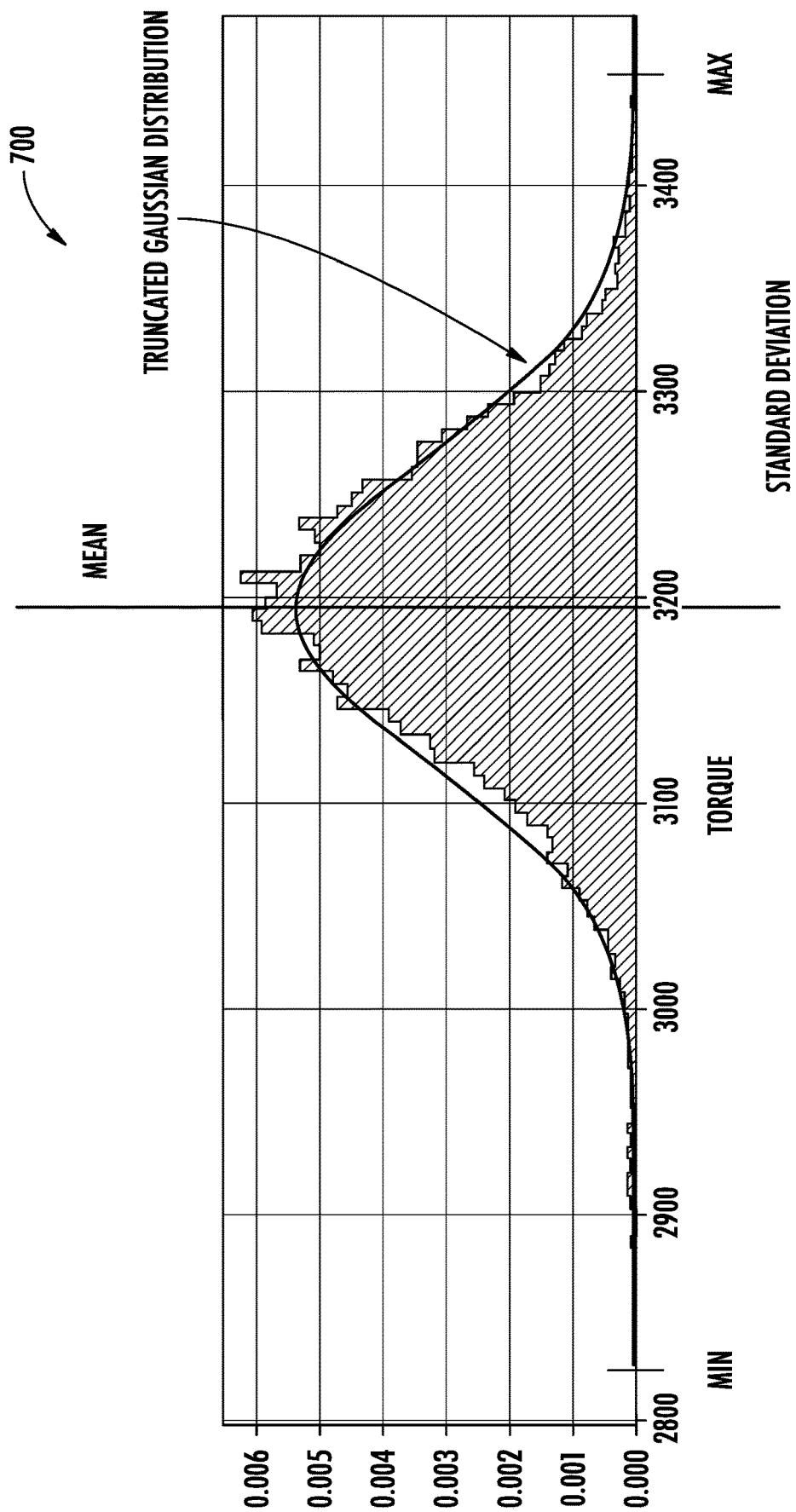
FIG. 11 illustrates one embodiment of a cumulative loads histogram according to the present disclosure.

FIG. 11 illustrates a graph of one embodiment of a cumulative loads histogram 700 according to the present disclosure. In particular, as shown, the cumulative loads histogram 700 illustrates how a truncated Gaussian distribution can be fit to mean, standard deviation, minimum and maximum statistics over a time period. This creates an approximation of the distribution of the original measurement data, which can be used to accumulate the histogram for the time period.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a wind turbine, the method comprising:

determining one or more loading metrics or functions thereof, and determining one or more travel metrics or functions thereof, for one or more components of the wind turbine during operation of the wind turbine;

generating at least one distribution of cumulative loading data for the one or more components using the one or more loading metrics or functions thereof and the one or more travel metrics or functions thereof during operation of the wind turbine, the generating comprising:

defining a range and a bin region of the at least one distribution of cumulative load data;

defining a first loading metric of the one or more loading metrics or functions thereof and a first travel metric of the one or more travel metrics or functions thereof for the at least one distribution of cumulative load data;

during operation of the wind turbine, updating the at least one distribution of cumulative load data using the first loading metric and the first travel metric by adding the first travel metric to the bin region of the first loading metric of the at least one distribution of cumulative load data; and adaptively changing at least one of the range or the bin region based on on-going operational data of the wind turbine;

applying a life model of the one or more components to the at least one distribution of cumulative loading data to determine an actual damage accumulation for the one or more components of the wind turbine to date; and implementing a corrective action for the wind turbine based on the damage accumulation.

2. The method of claim 1, wherein the one or more loading metrics for one or more components of the wind turbine comprise at least one of a bearing load, a tower load, a rotor blade load, a drivetrain load, a shaft load, a thermal load, and wherein the one or more travel metrics comprise at least one of time, angular travel, a number of times a component travels a certain angular distance between directional reversals, or a number of times the one or more components go through a stress cycle at a particular load.

3. The method of claim 1, wherein the one or more components comprise at least one of a pitch bearing, a yaw bearing, a tower, a gearbox, a generator, a rotor blade, a rotor, a hub, a shaft, a converter, or a nacelle.

4. The method of claim 1, wherein the functions of the one or more loading metrics and the functions for the one or more travel metrics each, respectively, further comprise at least one of a mean, a minimum, a maximum, a standard deviation, a quantile, or a median.

5. The method of claim 1, wherein determining the one or more loading metrics or functions thereof, and determining the one or more travel metrics or functions thereof, for one or more components of the wind turbine during operation of the wind turbine further comprises:
at least one of measuring the one or more loading and travel metrics for one or more components of the wind turbine via one or more sensors or processors for estimating the one or more loading and travel metrics for one or more components of the wind turbine via the one or more processors.

6. The method of claim 5, further comprising estimating the one or more loading and travel metrics for one or more components of the wind turbine in real-time.

7. The method of claim 5, further comprising estimating the one or more loading and travel metrics for one or more components of the wind turbine using machine learning.

8. The method of claim 5, wherein the processor comprises a physics-based system model for estimating the one or more loading and travel metrics for one or more components of the wind turbine.

9. The method of claim 1, further comprising determining a plurality of loading metrics and a plurality of travel metrics for one or more components of the wind turbine during operation of the wind turbine.

10. The method of claim 1, wherein generating the at least one distribution of cumulative loading data for the one or more components using the one or more loading metrics or functions thereof and the one or more travel metrics or functions thereof during operation of the wind turbine further comprises generating at least one cumulative load histogram for the one or more components using the one or more loading and travel metrics.

11. The method of claim 10, wherein generating the at least one cumulative load histogram for the one or more components using one or more loading metrics of functions thereof and the one or more travel metrics or functions thereof further comprises:
defining a range and a bin region of the at least one cumulative load histogram;
defining a first loading metric of a plurality of loading metrics and a first travel metric of a plurality of travel metrics for the at least one cumulative load histogram; and
during operation of the wind turbine, updating the at least one cumulative load histogram using the first loading and travel metrics by adding the first travel metric to the bin region of the first loading metric of the at least one cumulative load histogram.

12. The method of claim 11, further comprising adaptively changing at least one of the range or the bin regions based on on-going operational data of the wind turbine.

13. The method of claim 10, further comprising applying a life model of the one or more components to a plurality of cumulative load histograms generated over distinct time segments.

14. The method of claim 10, further comprising processing the at least one cumulative load histogram before applying the life model of the one or more components, wherein processing the at least one cumulative load histogram before applying the life model of the one or more components comprises re-defining the range or bin regions of the at least one cumulative load histogram.

15. The method of claim 14, wherein processing the at least one cumulative load histogram before applying the life model of the one or more components further comprises at least one of smoothing or recalibrating the at least one cumulative load histogram to yield a more accurate estimate of historical loading estimates, or scaling the at least one cumulative load histogram to a desired time duration expected by the life model.

16. The method of claim 1, wherein implementing the corrective action for the wind turbine based on the damage accumulation further comprises shutting down the wind turbine, idling the wind turbine, changing a control parameter of the wind turbine, or scheduling one or more preventative maintenance actions.

17. A system for operating a wind turbine, the system comprising:
a controller configured to implement a plurality of operations, the plurality of operations comprising:
determining one or more loading metrics or functions thereof, and determining one or more travel metrics or functions thereof, for one or more components of the wind turbine during operation of the wind turbine;
generating at least one cumulative load histogram for the one or more components using the one or more loading metrics or functions thereof and the one or more travel metrics or functions thereof during operation of the wind turbine, the generating comprising:
defining a range and a bin region of the at least one cumulative load histogram;
defining a first loading metric of the one or more loading metrics or functions thereof and a first travel metric of the one or more travel metrics or functions thereof for the at least one cumulative load histogram;
during operation of the wind turbine, updating the at least one cumulative load histogram using the first loading metric and the first travel metric by adding the first travel metric to the bin region of the at least one cumulative load histogram; and
adaptively changing at least one of the range or the bin region based on on-going operational data of the wind turbine;
applying a life model of the one or more components to the at least one cumulative loading histogram to determine an actual damage accumulation for the one or more components of the wind turbine to date; and
implementing a corrective action for the wind turbine based on the damage accumulation.

18. The system of claim 17, wherein the one or more loading metrics for one or more components of the wind turbine comprise at least one of a bearing load, a tower load, a rotor blade load, a drivetrain load, a shaft load, and wherein the one or more travel metrics comprise at least one of time, angular travel, a number of times a component travels a certain angular distance between directional reversals, or a number of times the one or more components go through a stress cycle at a particular load.

19. The system of claim 17, wherein generating the at least one cumulative load histogram for the one or more components using the one or more loading metrics or functions thereof and the one or more travel metrics or functions thereof further comprises:

defining a range and bin regions of the at least one cumulative load histogram;

defining a first loading metric of the plurality of loading metrics and a first travel metric of the plurality of travel metrics for the at least one cumulative load histogram;

during operation of the wind turbine, updating the at least one cumulative load histogram using the first loading and travel metrics by adding the first loading and travel metrics to the bin regions of the first loading metric of the at least one cumulative load histogram.

20. The system of claim 19, wherein the plurality of operations further comprise adaptively changing at least one of the range or the bin regions based on on-going operational data of the wind turbine.

\* \* \* \* \*